United States Patent [19]

Babcock et al.

[11] Patent Number: 4,622,344

[45] Date of Patent: Nov. 11, 1986

[54] RECOVERY OF AMMONIACAL COPPER WITH NOVEL ORGANOGELS

[75] Inventors: Walter C. Babcock; Mark E. Tuttle; James W. Brooke, all of Bend, Oreg.

[73] Assignee: Bend Research, Inc., Bend, Oreg.

[21] Appl. No.: 585,977

[22] Filed: Mar. 5, 1984

[51] Int. Cl.⁴ ............................................. C08D 5/20
[52] U.S. Cl. ..................................... 521/28; 521/27; 524/87; 524/167; 524/210; 524/357
[58] Field of Search ..................... 521/28, 27; 524/87, 524/167, 210, 357

[56] References Cited

U.S. PATENT DOCUMENTS

| | | | |
|---|---|---|---|
| 2,465,296 | 3/1949 | Swiss | 524/357 |
| 2,615,857 | 10/1952 | Clarke | 524/87 |
| 3,030,416 | 4/1962 | Donatus et al. | 524/357 |
| 3,506,620 | 4/1970 | Davis et al. | 524/357 |

FOREIGN PATENT DOCUMENTS

| | | | |
|---|---|---|---|
| 55-161839 | 12/1980 | Japan | 524/357 |
| 57-67642 | 4/1982 | Japan | 524/357 |

OTHER PUBLICATIONS

Oesch et al, Anal. Chem., 52:692–700, (1980).

Primary Examiner—Joseph L. Schofer
Assistant Examiner—Peter F. Kulkosky
Attorney, Agent, or Firm—Chernoff, Vilhauer, McClung & Stenzel

[57] ABSTRACT

There is disclosed novel copper ion-exchange media and processes for the recovery of cupric ion from ammoniacal copper solutions and for the recovery of spent printed circuit board etchant. The novel ion-exchange media comprise hydrophobic nonporous polymer plasticized and swollen with a monomeric organic liquid copper ion-exchange agent such as beta-diketones or hydroxyoximes. A novel copper ion-complexing agent, 1-n-octylphenyl-p-1,3-butanedione, is also disclosed. The processes essentially comprise contacting the ammoniacal cupric ion-containing solution or spent etchant with the novel copper ion-exchange media to extract copper in cupric ion form. Copper can be recovered therefrom by conventional methods such as acid stripping and electrowinning.

10 Claims, 9 Drawing Figures

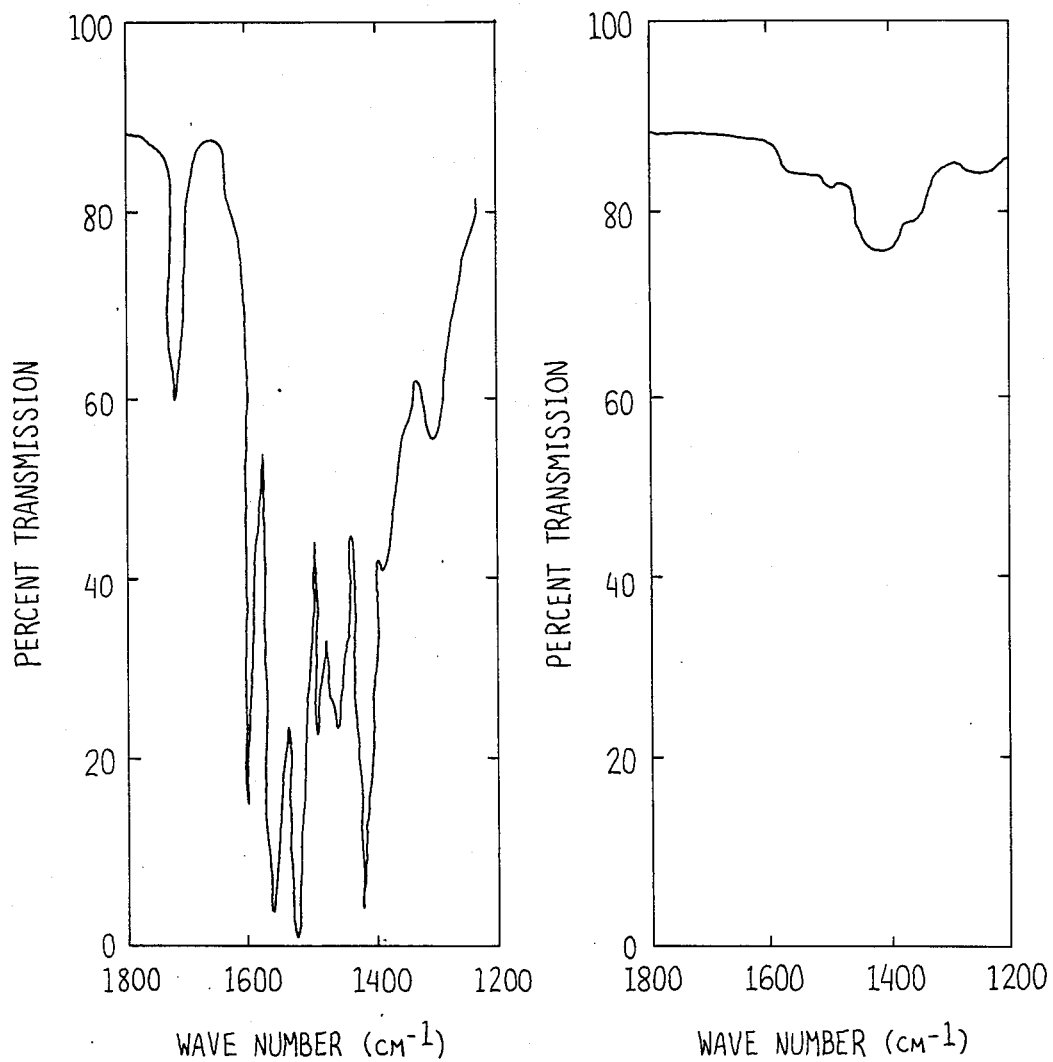

RECOVERY OF AMMONIACAL COPPER WITH NOVEL ORGANOGELS

The Government has rights in this invention pursuant to Contract No. DAR 8023179 awarded by the National Science Foundation.

BACKGROUND OF THE INVENTION

This invention relates to the recovery of copper values from cupric ion-containing ammoniacal solutions thereof, to the recovery and regeneration of spent printed circuit board etchant, and to ion-exchange media useful in such recoveries.

Extraction of metallic ions from aqueous solutions by ion exchange and solvent extraction with liquid complexing agents is known. There have been consistent problems in the art, however, with low selectivity and fouling of the aqueous effluent by the complexing agents, in some cases requiring further treatment of the effluent with chelating agents, and in others with adsorbent material.

Attempts have been made to immobilize the liquid complexing agents in solid porous media, but these have been subject to the same drawbacks. See, for example, Hughes et al. *Trans. Inst. Min. Metall.* 85 (1976) C123 which discloses the removal of cupric ion from an aqueous solution with the liquid ion-exchange complexing agent LIX 64N adsorbed onto an expanded polyurethane foam. Warshawsky, in *Trans. Inst. Min. Metall.* 83 (1974) C101 discloses the removal of copper ions with LIX 64N adsorbed into polymeric adsorbents of the XAD series. In South African Pat. No. 70/4209 to Lloyd, there is disclosed the removal of copper, gold and uranium with ion-exchange materials comprising clays impregnated with various ion-exchange compounds. An activated charcoal substrate for the complexing agents salicylaldoxime and benzolylacetone for the removal of copper, cobalt, nickel and iron from zinc sulphate solutions is disclosed in Moore U.S. Pat. No. 3,682,589. There are three major disadvantages of such porous supports. One is that they entrain feed solutions and so require a great deal of rinsing, which reduces the efficiency and selectivity of the extraction process. Another is that the liquid complexing agent is lost from the porous support rather rapidly. Finally, agent-filled supports in flat-sheet membrane and hollow-fiber membrane forms withstand only minimal pressure differentials, on the order of 10 psi or less, without agent being forced out of the pores, which restricts their use to low-pressure operations.

The industrial use of ammonia-containing solutions for the dissolution of copper and certain copper-containing materials is widespread. For example, the printed circuit board industry uses an alkaline ammonia etching process to remove unwanted copper from selected areas of printed wiring boards. This industry consumes about 9,000,000 gallons of ammonia etching solution annually which contains approximately 1.5 lb/gal of $NH_3$ in the form of free ammonia and ammonia salts and about 1.3 lb/gal of dissolved copper in the form of cupric (2+) ion. Typical printed circuit board etchants comprise a buffered ammoniacal solution with a pH of from 8 to 12 which may contain about 0.1 to about 1.0% by weight additives such as wetting and banking agents. Ammonia-containing solutions are also used by the mining industry for the leaching of copper values from certain copper-containing ores.

Copper metal cannot be recovered directly from these ammoniacal cupric ion-containing solutions. In the case of ammoniacal printed circuit board etchants, once the copper concentration reaches about 160 g/L the solution is considered spent and is either discarded or returned to the manufacturers. Copper is often recovered by the etchant manufacturer by raising the pH of the spent etchant and boiling off the ammonia, thus allowing copper to precipitate as the oxide.

Solvent extraction using selective liquid ion-exchange agents has also been suggested for the extraction of copper from such ammoniacal etch solutions. See, for example, U.S. Pat. Nos. 4,083,758, 4,252,621, and 4,350,667. In such solvent extraction processes the ammoniacal copper solution is intimately contacted with an organic liquid ion-exchange material that selectively extracts copper ions. A phase separation must then be performed to remove the copper-containing organic liquid from the aqueous ammoniacal solution. Copper is then removed from the loaded organic liquid ion-exchange agent by contact with an aqueous acid solution (such as sulfuric acid) which strips the copper from the organic ion-exchange agent. A second phase separation must then be performed to separate these aqueous and organic liquids.

Such prior art liquid-liquid phase separation steps in the solvent extraction process are cumbersome and require expensive and complex equipment. As disclosed in U.S. Pat. No. 4,252,621, in the case of ammoniacal printed circuit board etchant regeneration, it is essential that no organic ion-exchange agent remain in the etchant solution as this material could contaminate the surface of the printed wiring boards, causing serious complication in subsequent processing steps. Therefore, not only must the liquid-liquid separation steps be closely and carefully controlled, but the etchant solution must also be carbon filtered to remove the last traces of organic ion-exchange agent before becoming useable again.

The use of solvent extraction techniques by the mining industry for the recovery of copper from ammonia leach solutions involves extensive liquid-solid separations along with liquid-liquid separations. After the finely ground ore is contacted with the ammonia leach solution, as many as five separate liquid-solid separation steps may be required. Finally, the leach solution must be filtered to insure that no particulates are present onto which the organic liquid ion-exchange agent may adsorb in the solvent extraction stage. Solvent extraction is then performed on the filtered leach solution in stages. To insure the most efficient recovery of copper from the ammonia leach in such processes, several extractions are performed, each of which reduces the copper concentration to a successively lower level until nearly all the copper has been extracted. The extraction solutions are then combined and washed at least once with water to remove any entrained leach solution. Each extraction and wash stage requires its own liquid-liquid separation equipment. The loaded liquid ion-exchange agent must then be stripped of its copper content, which again requires additional liquid-liquid separation equipment.

It is apparent from the foregoing that there is a great need in the ammoniacal copper recovery art for a simple and inexpensive ion-exchange method that may be accomplished without extensive liquid-liquid separations and with ion-exchange media that have superior agent retention, a long life, and are reuseable. These and other objects are accomplished by the present invention, which is summarized and more particularly described below.

SUMMARY OF THE INVENTION

The key to the present invention resides in immobilizing liquid copper extraction agents in a polymeric gel matrix. By so immobilizing the agent, the need for the complex, time-consuming, and cumbersome prior art liquid-liquid separations in ammoniacal copper recovery is eliminated. At the same time the so-immobilized agent is not free to adsorb onto particulates, thus eliminating the need for similarly complex liquid-solid separations. Furthermore, such gels exhibit far superior agent retention as compared with prior art attempts at immobilization of copper extraction agents, thus allowing extensive reuse as copper extraction media. Agent is apparently retained in the gel matrix by short-range intermolecular attractive interactions between the polymer and agent molecules. Such forces include hydrogen bonding, London, Van der Waals, and Debye forces, and can be very large. For example, the amount of external pressure required to "squeeze" out the majority of agent from a swollen gel of the present invention can be in excess of 1000 psi, which is two orders of magnitude greater than the pressure required to force agent from prior art porous supports.

There are esentially four aspects to the present invention: (1) novel copper ion-exchange gels comprising hydrophobic nonporous polymer plasticized and swollen with a monomeric organic liquid copper ion-exchange agent; (2) a novel ion-exchange agent useful in the recovery of copper ion from ammoniacal solutions thereof; (3) a process for the recovery of copper ion, the essential step comprising contacting an ammoniacal copper ion-containing solution with the novel gels recited in (1); and (4) a process for the recovery and regeneration of spent ammoniacal printed circuit board etchant, the essential step comprising contacting spent etchant solution with the novel gels recited in (1).

BRIEF DESCRIPTION OF THE DRAWINGS

FIGS. 4a and 4b comprise two graphs comparing the IR spectra of freshly prepared conventional agent-filled porous film and the same film after forty days' use.

DETAILED DESCRIPTION OF THE INVENTION

Figure 1:
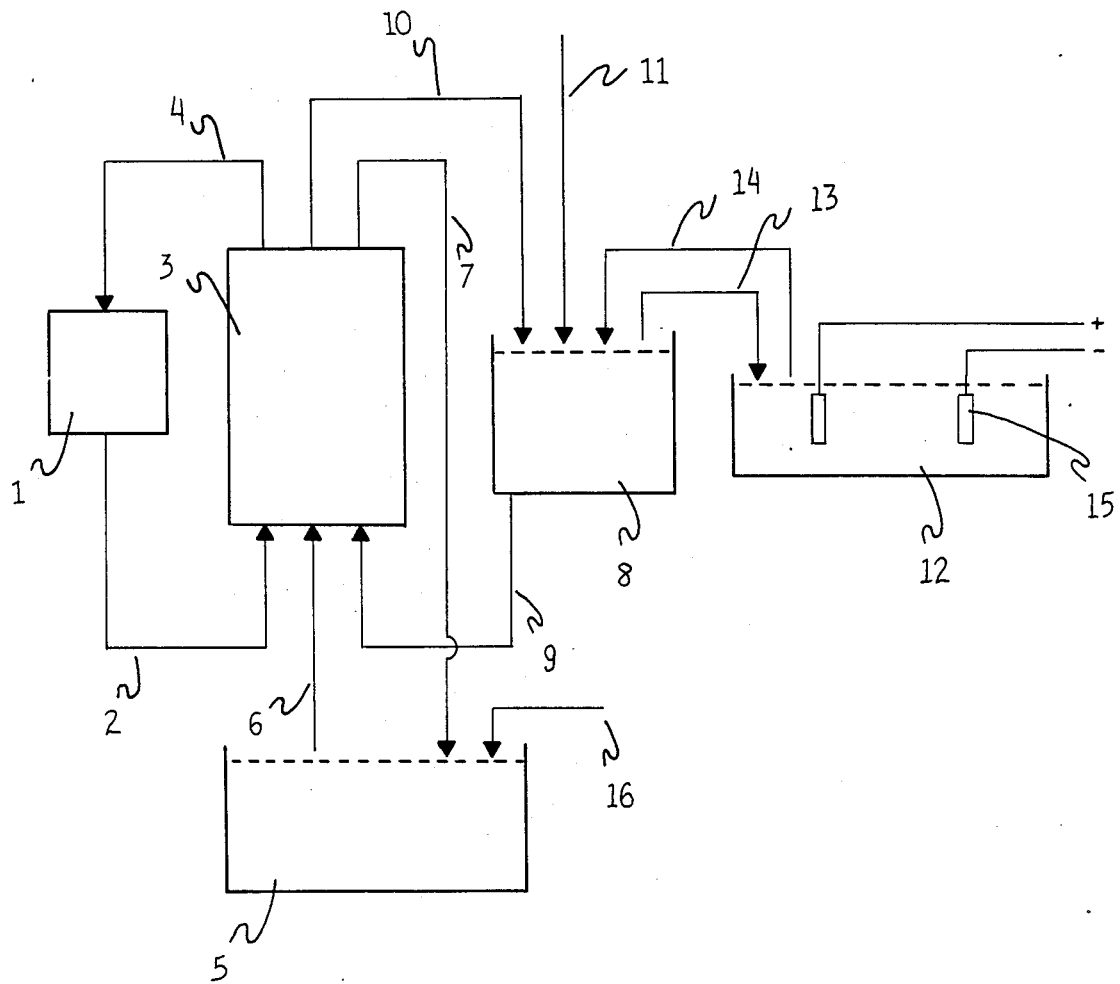
FIG. 1 is a schematic diagram of an exemplary copper and etchant recovery process utilizing the present invention.

The novel copper ion-exchange gels of the present invention generally comprise hydrophobic nonporous polymers that are plasticized and swollen with a monomeric liquid ion-exchange agent.

Plasticization of polymers is well known and can generally be said to be accomplished when an organic liquid is mixed with the polymer to yield a homogeneous rubbery texture with the polymer having a lower glass transition temperature than prior to addition of the organic liquid. The glass transition temperature of a polymer is susceptible to objective measurement by a number of means, such as differential scanning calorimetry (DSC), softening point measurements and light scattering measurements. The swelling of a polymer with a liquid agent is not as susceptible to objective measurement as plasticization, but generally comprises an expansion in volume accompanied by a take-up of at least 50 weight percent of liquid agent.

When copper extraction agent is used to both plasticize and swell hydrophobic nonporous polymers, the agent and polymer become integrated into an essentially homogeneous gel that has the copper ion-extraction properties of the agent, the immobilizing and tensile strength properties of the polymer and the new unexpected combined properties of far superior agent retention, the ability to resist solution entrainment and therefore the ability to exclude impurities as well.

Typical hydrophobic nonporous polymers useful in the ion-exchange gels of the present invention include alkyl-, aryl-, halogen- and amino-substituted polyethylenes, polypropylenes, polyacrylics, polyacrylates, polyurethanes, polyamides, polyetherimides, polyvinylbutyrals, polyacrylonitriles, polynorborenes, polyvinylacetates, ethylene-vinylacetate copolymers, ethylene-propylene rubbers, styrene butadiene rubbers, and silicone rubbers.

Suitable monomeric liquid ion-exchange agents include conventional ones known in the ion-exchange art and a novel cupric ion-complexing agent, 1-n-octylphenyl-p-1,3-butanedione, hereinafter referred to as DKn8. Agents include DKn8 and alkyl-, aryl-, halogen- and amino-substituted amides, beta-diketones, hydroxyoximes, sulfonamido quinolines, macrocyclic ethers, and macrocyclic amines. Preferred agents are beta-diketones, hydroxyoximes, hydroxyquinolines, sulfonamido oximes, or mixtures of such agents. Specific examples of hydroxyoximes include 2-hydroxy-5-alkyl-benzaldehyde oxime, 2-hydroxy-alkylbenzophenone oximes, 2,6-diformyl4-alkylphenol dioximes, and 5,8-diethyl-7-hydroxydodecane-6-one oxime. An example of a hydroxyquinoline is beta-alkenyl 8-hydroxyquinoline sold under the trade name Kelex 100 by Ashland Chemicals, Inc. of Columbis, Ohio. An example of a sulfonamido quinoline is 8-(aklaryl sulfonamido) quinoline, sold under the trade name LIX 34 by Henkel Chemical Co. of Minneapolis, Minn. Examples of sulphonamido oximes include 2-(dodecylbenzenesulfonamido) benzophenone oxime and 2-(dodecylbenzenesulfonamido) acetophenone oxime. The most preferred agent for copper extraction is a beta-diketone with at least one aryl substituent, such as those generally of the formula

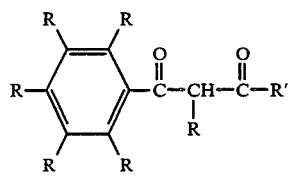

where R is hydrogen or alkyl and R' is hydrogen, alkyl, aryl or alkaryl. An especially preferred beta-diketone is the commercial reagent manufactured and sold under the name of LIX 54 by Henkel Chemical Co. of Minneapolis, Minn. LIX 54 contains six active copper-complexing compounds, including the ortho-, meta-, and para-forms of the compounds 1-hexylphenyl-1,3-butane dione and phenyl bis-[1,3-butane dione].

For effective removal of copper to less than 10 ppm, the agent may be present in substantially pure form or in a hydrocarbon diluent at concentrations as low as 5 vol %. Effective removal of ions from ammoniacal copper solutions occurs at a pH of from about 5 to about 12.5 and at a temperature from about 20° C. to about 80° C.

DKn8 is prepared by reaction of phenyloctane with acetyl chloride in the presence of aluminum chloride, then washing and drying the product, the product in turn being reacted with ethyl acetate, all in accordance with the process conditions set forth in Example 4 herein.

Not all polymers listed above can be mixed with any one of the agents listed to form suitable gels as only certain combinations are compatible. Compatibility, and although somewhat difficult to predict, can be measured empirically in the following manner. Agent and polymer are dissolved in a cosolvent and then the solvent is allowed to evaporate. Upon evaporation of the cosolvent the polymer and agent can remain homogeneous in the form of a gel (indicating at least some degree of compatibility) or they can separate into two phases (indicating they are not compatible). Agent/polymer combinations that remain as homogeneous gels can then be stored in a sealed container. A lesser degree of compatibility is indicated if agent exudes from the polymer over time. A further test involves placing a freshly prepared gel in agent solution. Particularly compatible polymer/agent combinations will swell, taking up additional agent. The entire procedure described above should be repeated with the agent/metal-ion complex to insure continued compatibility upon uptake of metal ions.

Solubility parameters have also proven useful to some extent in predicting compatibility between polymers and potential plasticizers or agents. The solubility parameter of a compound can be viewed as a measure of the intensity of intermolecular interactions in the pure compound. Polymers tend to be compatible with organic solutions that have about the same solubility parameter. An additional consideration in the gels of the present invention is that the solubility parameter of the agent is often somewhat different from that of the agent/metal-ion complex. Thus, the preferred polymer for a particular metal-complexing agent should have a solubility parameter intermediate between that of the agent alone and the metal-ion/agent complex.

Although the solubility parameter is useful in selecting candidate polymeric matricies for agent immobilization, at least some trial and error testing (as described above) is necessary to determine the most suitable polymer/agent combination. A detailed discussion of solubility parameters as they apply to plasticization of polymers can be found in Sears et al., *The Technology of Plasticizers* (1982).

An interesting phenomenon useful in the present invention is that a mixture of two organic liquids, one with solubility parameter somewhat higher than that of the polymer and the other with solubility parameter somewhat lower than that of the polymer, is found to be more compatable with the polymer than either compound alone. This phenomenon can be used to advantage in the present invention. Thus, mixing of the metal complexing agent with up to 75% of an appropriate organic liquid (which acts as a coplasticizer) often improves compatibility. For example, mixture of DKn8 with a high boiling point aromatic hydrocarbon increases the compatibility of the agent in silicone rubber.

An additional advantage of mixing the agent solution with another organic liquid is that it can both further plasticize the polymer and also act as a solvent for the agent or agent/metal-ion complex, thereby increasing their mobility in the polymeric matrix. This is important in order for metal ions to be extracted into and stripped from the gels in a practical period of time.

The agent-swollen gel of the present invention may be formed in virtually any way that incorporates agent into the polymer in such a manner as to plasticize the same. Exemplary methods include (1) dissolving the polymer and agent with or without a plasticizer in a volatile solvent and then allowing the volatile solvent to evaporate (Examples 6 and 10); (2) soaking the polymer in agent with or without a plasticizer (Examples 5 and 9); and (3) forming the polymer by reaction of appropriate monomers with or without a plasticizer present and then soaking the polymer in agent (Examples 1, 2, and 3).

Although the precise form of the gels of the present invention is not important, three forms are conveniently made: (1) non-supported gel (Examples 1, 5, 6, 8, 9, and 10); (2) porous media impregnated with gel (Examples 2 and 3); and (3) porous media impregnated with agent and coated with agent-swollen gel (Example 7). The third form has the advantages of (1) having a relatively higher amount of agent since it contains pure agent on the interior of the porous material and (2) being stronger since the porous substrate with gel coating is more rigid than the pure gel form. The agent-swollen gel can be fabricated into any shape desired including beads, chunks, solid fibers, flat sheets, or hollow fibers. The preferred shapes are flat sheets or hollow fibers as these allow the agent-swollen gel to be used in a more efficient, simpler, and continuous mode, as will be discussed below.

Agent-swollen gel can be utilized to recover copper from ammoniacal solutions via two types of processes. In one process, copper is recovered in two steps. Copper is first extracted from the ammoniacal aqueous solution and into the agent-swollen gel by circulating the ammoniacal solution through a chamber that contains the gel as chunks, fibers, or beads. Copper is then reextracted (stripped) from the copper-containing gel into an acidic product solution by circulating the acidic solution through the gel-containing chamber.

The other process is a one-step process in which the gel, in the form of a flat sheet or hollow fiber, acts as a copper-transporting membrane, and is interposed between a copper-containing ammoniacal solution and an acidic product (strip) solution. Copper is extracted from the ammoniacal solution into the agent-swollen gel membrane. The copper (in the form of an organic soluble metal ion-agent complex) then diffuses to the opposite side of the membrane where it is stripped from the membrane and into the acidic product solution.

Figure 2:
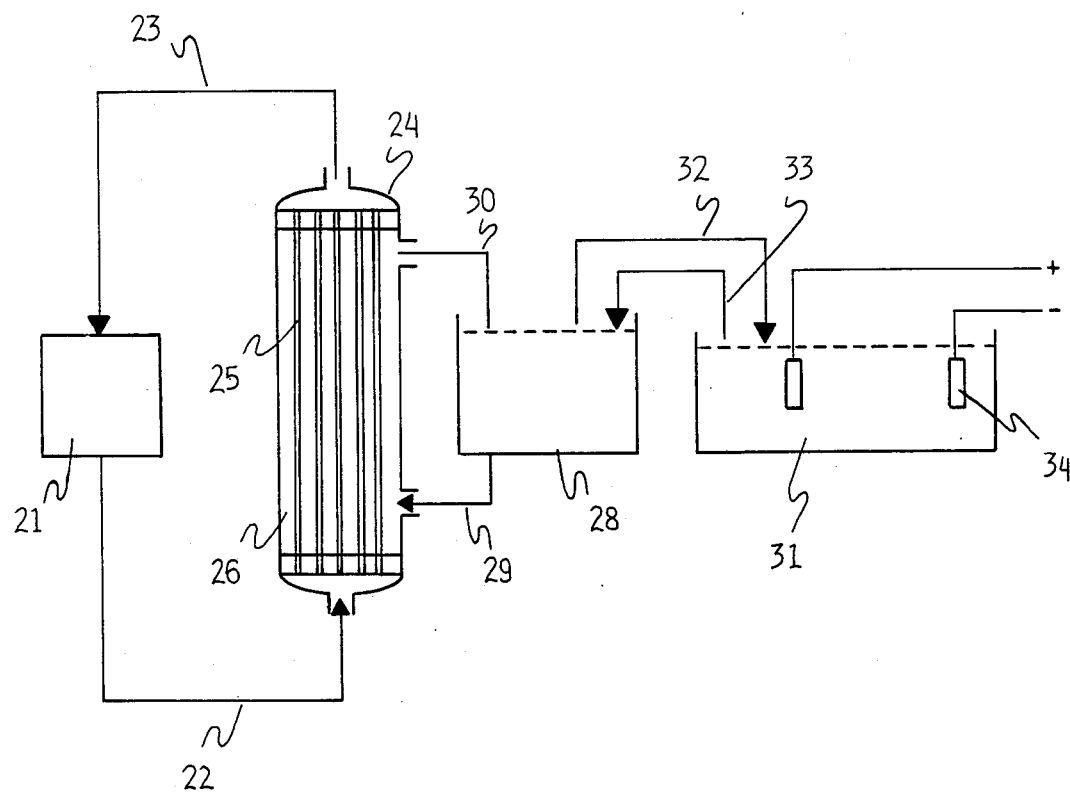
FIG. 2 is a schematic diagram of another exemplary copper and etchant recovery process utilizing the present invention.

Each type of process is shown schematically in FIGS. 1 and 2 for the application of the present invention to the regeneration of spent ammoniacal copper etchant. In the two-step process shown in FIG. 1, ammoniacal etchant rich in copper (greater than 100 g/L) is pumped from the etching chamber 1 via a conduit 2 through a column or chamber 3 that contains an agent-swollen gel of the type previously described. Ammoniacal etchant partially depleted in copper exits from the chamber and returns to the etching chamber 1 via conduit 4. When the capacity of the gel to extract copper has been exhausted, the chamber 3 is drained the solution being returned to the etching chamber 1. A small volume of rinse solution composed of dilute ammonia (0.1 to 10 g/L $NH_3$) is circulated from a reservoir 5 through the gel chamber 3 via conduits 6 and 7 to rinse residual etchant from the gel. The rinse solution is drained back into the rinse solution reservoir 5 and then product solution composed of a dilute acid, preferably 5 to 200 g/L $H_2SO_4$ is circulated from a reservoir 8 to the gel chamber 3 via conduits 9 and 10 to strip copper from the agent-swollen gel. A small amount of $H_2SO_4$ is added periodically to keep the product solution sufficiently acidic. When essentially all of the copper has been stripped from the gel the product solution is drained back into the product solution reservoir. The gel is again rinsed with the same rinse solution used previoualy via conduits 6 and 7 and drained back into the rinse solution reservoir 5. Ammonia is added as necessary to the rinse solution in order to maintain the pH at 7.0 or higher. During this second rinse, copper from the first rinse is extracted into the gel and subsequently transferred to the strip solution.

This entire procedure is repeated by again pumping etchant through the gel chamber. Throughout the process, product solution is circulated via conduits 13 and 14 from the product solution reservoir to an electrolytic cell 12 where copper is recovered as metal via electrolytic reduction at a stainless steel or titanium cathode 15.

In the continuous membrane process shown in FIG. 2, ammoniacal etchant containing a high concentration of copper is circulated from the etching chamber to an agent-swollen gel membrane module via conduit 22. The membrane module is composed of hollow fibers made of agent-swollen gel either unsupported or supported within a more rigid porous hollow fiber, all potted into a pipe. However, the analogous process can also be carried out with flat-sheet membranes, utilized in either of two known configurations: spiral wound or plate and frame. In the case of hollow-fiber membranes, the etchant solution passes down the lumen (interior) of the hollow-fiber membranes and exits at the opposite end of the module partially depleted of copper, copper being extracted from the etchant and into the gel membranes 25. Copper in the form of a complex with agent permeates through the membrane to the opposite surface and is reextracted into the product solution, which is simultaneously being circulated from the product solution reservoir 28 through the hollow-fiber membrane module 24 around the outside 26 of the hollow fibers 25 via conduit 29 and then back to the product solution reservoir 28 via conduit 30. Copper dissolved in the acidic product solution is continuously recovered by circulating the product solution via conduits 32 and 33 from the product solution reservoir to the electrolytic cell 31 where copper is recovered as copper metal via electrolytic reduction at a stainless steel or titanium cathode 34.

This process has been detailed here for ammonia etch regeneration as an example only. It is understood that this process can be used in a similar manner for the recovery of copper from other ammonia-containing solutions as well, such as those used by the mining industry or for the dissolution of other copper-containing materials, and for the recovery of metals other than copper with appropriate extraction agents.

EXAMPLE 1

A methacrylate gel swollen with the commercial beta-diketone copper-complexing agent LIX 54 was prepared by first preparing a monomer solution comprising 47.5 vol % iso-decylmethacrylate and 2.5 vol % tetraethylene glycol dimethacrylate in Aliquat 336 (Tricaprylmethylammonium chloride produced by Henkel Chemical Co. of Minneapolis, Minn.). 5 ml of this solution was floated on top of 10 ml of an aqueous initiator solution in a test tube. The initiator solution comprised 8 wt % $(NH_4)_2S_2O_8$, 4 wt % $Na_2S_2O_5$, and 0.1 wt % $Fe(NH_4)_2(SO_4)_2$. The entire contents of the test tube were heated to 60° C. for 20 minutes after which time the entire organic phase had formed a crosslinked polymethacrylate gel. The gel was then removed from the test tube and soaked in LIX 54 for 24 hours to exchange the Aliquat 336 for LIX 54.

EXAMPLE 2

The LIX 54-swollen methacrylate gel of Example 1 was incorporated into a microporous flat-sheet film (membrane) in the following manner. An 8 cm×8 cm piece of Celgard 2400 (microporous polypropylene film approximately 1 mil thick, made by Celanese Plastics Co. of Philadelphia, Pa.) was dipped in the monomer solution of Example 1. The loaded membrane was placed in the initiator solution of Example 1 at 60° C. for 20 minutes. The membrane was then soaked in LIX 54 for several days.

EXAMPLE 3

A hollow-fiber membrane module was constructed by potting the ends of 33 anisotropic microporous polysulfone hollow fibers having an average outside diameter of about 0.6 mm and a wall thickness of about 0.5 mm in a vinyl chloride pipe with an inside diameter of about 2.5 cm and about 42 cm in length. The total useful surface area of the fibers was about 230 cm². A methacrylate gel was incorporated into the pores of the fibers by evacuating the module and then allowing monomer solution, of the composition described in Example 1, to be drawn into the fiber lumens and through the fiber walls thus filling the porous fiber walls. Excess monomer solution was rinsed from the hollow fibers with water and then initiator solution of the composition described in Example 1 was circulated through the fiber lumens at 60° C. for 1 hour. The module was then rinsed with water and filled with LIX 54 and soaked for 24 hours to exchange the Aliquat 336 for LIX 54. The module was then drained and rinsed with water.

EXAMPLE 4

The novel cupric-ion complexing agent, DKn8, was made by the following procedure. 500 ml of 20 vol % phenyloctane in carbon tetrachloride was slowly added over 2 hours to a stirred round-bottom flask submerged in an ice-water bath that contained 600 ml of a 17 wt % solution of aluminum chloride and 5.5 wt % acetyl chloride in carbon tetrachloride. The resulting solution was first washed with 1 L of 50 vol % aqueous hydrochloric acid and then with 1 L of 2M sodium hydroxide and finally with water until neutral. The washed organic solution was then dried by stirring over anhydrous magnesium sulfate for 1 hour and then the carbon tetrachloride was removed by vacuum rotary evaporation at about 45° C. The residue was then taken up in anhydrous diethylether and slowly added under a nitrogen atmosphere to 400 ml of freshly distilled ethyl acetate and 160 g sodium hydride in 600 ml anhydrous diethyl-ether. After the addition was complete the solution was refluxed for two hours, neutralized with hydrochloric acid, and washed with several liters of water to a neutral pH. The diethylether solution was then agitated for 5 minutes with 1 L of an aqueous solution of 2000 ppm copper and 25 g/L ammonia. The organic phase was transferred to a crystallizing dish and allowed to stand at room temperature for 16 hours. The product, green needle-like crystals, was isolated as the copper complex by filtration at 0° C.

EXAMPLE 5

A DKn8-swollen silicone rubber gel was made in the following manner. Silicone sealant (made by Dow Corning Corp. of Midland, Mich.) was extruded into a roughly cylindrical shape about 3 to 5 mm in diameter and allowed to air cure at room temperature for several days. About 1.26 g of the silicone rubber was then cut into small chunks about 2 to 5 mm in length and placed in 10 ml of an organic solution composed of 5 vol % DKn8 in Kermac 470B (hydrocarbon diluent comprising 30 vol % paraffins, 49 vol % naphthalenes, and 17 vol % aromatics made by Kerr-McGee Refining Corporation of Oklahoma City, Okla.) and allowed to soak for 48 hours, producing silicone rubber gel chunks. The chunks were then removed from the agent solution and excess agent removed by wiping with absorbent paper. The mass of the gel chunks had increased to 3.48 g indicating that the silicone rubber had become highly swollen with the agent solution.

EXAMPLE 6

A LIX 54-swollen ethylene-vinylacetate copolymer gel was made in the following manner. 2.0 g of Elvax 250, a copolymer composed of 72 wt % ethylene and 28 wt % vinyl acetate (made by DuPont Co. of Wilmington, Del.) was dissolved in 20 ml of toluene at 80° C. 40 ml of LIX 54 was then added to the solution. The warm solution was poured into a shallow glass container such that the solution was 2 to 4 mm deep. The toluene was allowed to evaporate from the solution over a period of 48 hours forming a LIX 54-swollen polymeric gel-like sheet about 1 to 2 mm thick. This material was cut up into small pieces about 1 to 3 mm in length.

EXAMPLE 7

Microporous polysulfone beads (made by Bend Research, Inc., of Bend, Ore.) about 2 to 3 mm in diameter and having surface pores less than 0.1 micron in diameter and interior pores 10 to 100 microns in diameter and a porosity of 85% were impregnated with LIX 54 by placing about 10 ml of beads and 100 ml of LIX 54 in a vacuum flask. The pressure in the flask was alternately reduced to less than 10 mmHg and then allowed to return to 1 atmosphere several times over a 3-hour period. A gel coating was then formed on the surface of these LIX 54-impregnated beads by spraying a solution of 5 g Elvax 250 and 5 ml LIX 54 per 100 ml of tetrahydrofuran onto the beads in a fluidized bed using a pressurized air spray nozzle.

EXAMPLE 8

LIX 54-swollen polynorborene was prepared by placing 2 g Norsorex polynorborene resin (made by R.E.G. Associates of Bound Brook, N.J.) and 8 ml LIX 54 in a beaker and allowing the Norsorex to absorb the LIX 54 over a period of 4 hours. The LIX 54-swollen resin was then melted by heating to approximately 120° C. The hot liquid resin was then poured into a shallow glass container and allowed to cool. The gel-like polymeric film thus formed was about 2 mm thick and was then cut into small pieces 1 to 4 mm in length.

EXAMPLE 9

Another agent-swollen silicone rubber gel was made in the following manner. Dow Corning silicone sealant was extruded into a roughly cylindrical shape about 3 to 5 mm in diameter and allowed to air cure for 96 hours. About 5 g of the silicone rubber was cut into small pieces about 2 to 5 mm in length and soaked in 30 vol % Acorga P-5100 (2-hydroxy-5-alkylbenzaldehyde oxime in hydrocarbon diluent manufactured by Acorga Ltd. of Hamilton, Bermuda) in Kermac 470B for 16 hours. The gel pieces more than doubled in mass upon soaking in the agent solution. Excess agent was removed from the gel pieces by wiping with absorbent paper.

EXAMPLE 10

A LIX 54-swollen polyurethane gel was made by dissolving 17 g of Roylar E85N, a polyurethane resin (made by Uniroyal, Inc. of Naugatuck, Conn.) in 120 ml tetrahydrofuran. 34 ml LIX 54 was then added to the polymer solution and the mixture poured into two flat-bottom glass dishes 20 cm in diameter. The tetrahydrofuran was allowed to evaporate over 24 hours. The resulting gel was cut into small pieces about 2 to 5 mm in diameter.

EXAMPLE 11

Figure 3B:
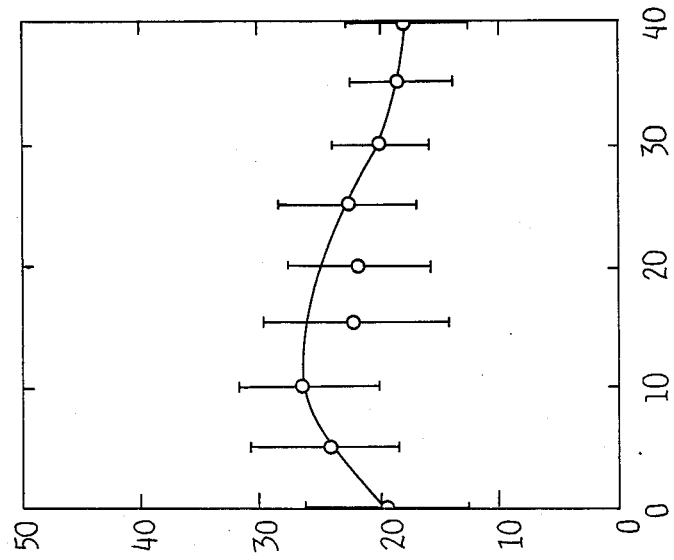
FIGS. 3a and 3b comprise two graphs comparing the rate of cupric-ion-transport ability or copper flux across a porous film containing ion-exchange agent and a gel film of the present invention incorporating the same agent.
Figure 3A:
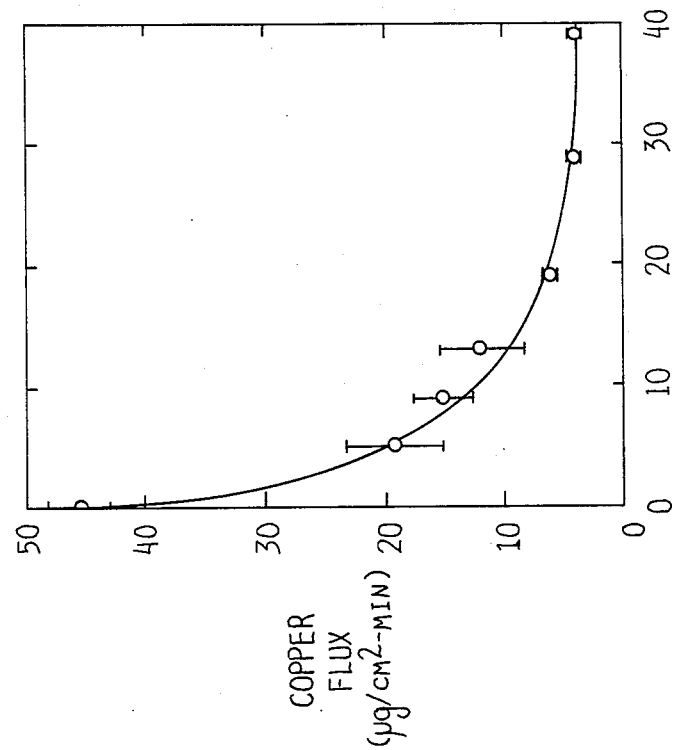
Figures 5A, 5B:
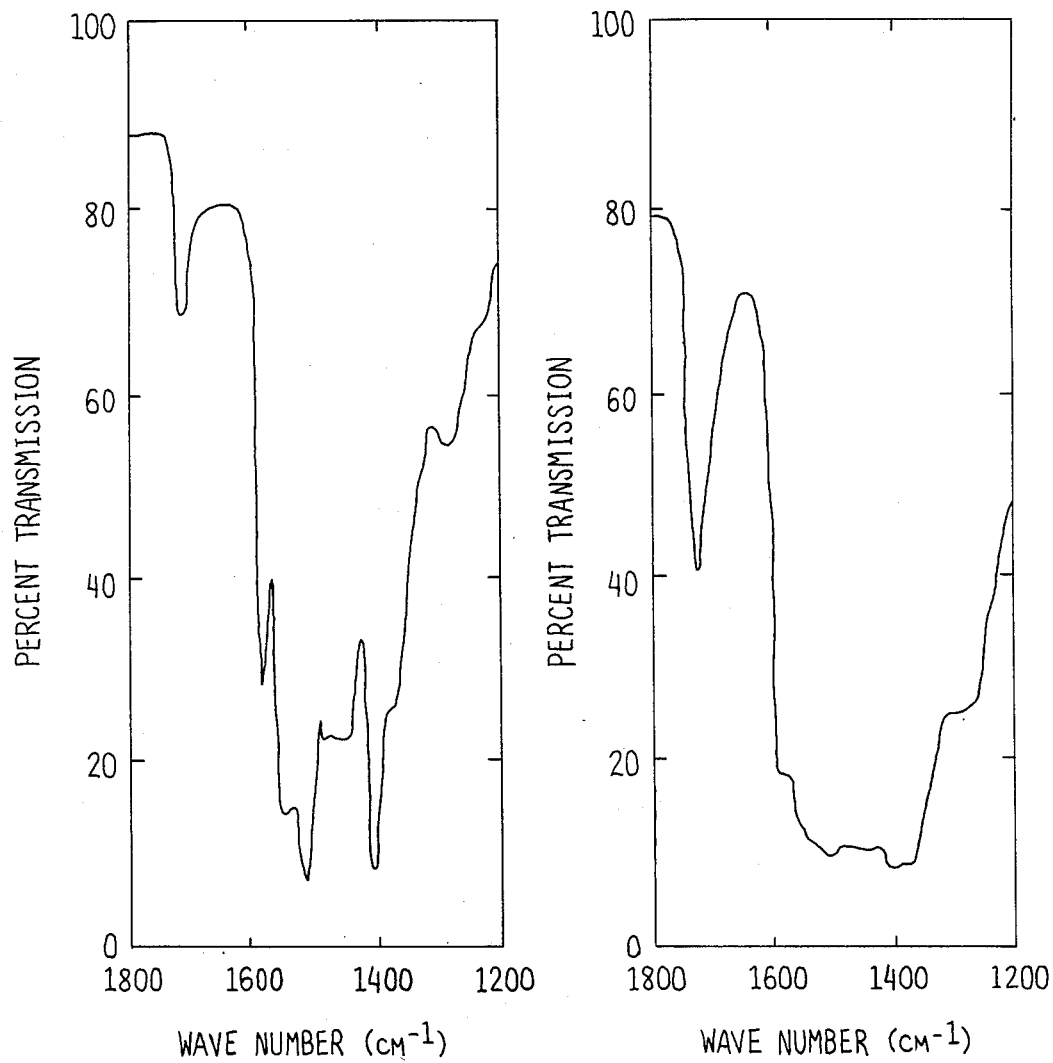
FIGS. 5a and 5b comprise two graphs comparing the IR spectra of films similar to those shown in FIGS. 4a and 4b over the same time period, with the exception that the films contained the gel form of the present invention.

Nine LIX 54-swollen gel membranes of the type described in Example 2 were tested by interposing the membranes between an ammoniacal solution that contained 2 g/L copper and a product solution composed of 100 g/L $H_2SO_4$. Copper initially permeated through the membrane from the spent etchant solution to the acid product solution at an average rate for the nine membranes of about 20 $\mu g/cm^2$-min. Ammonia could not be detected in the product solution after several hours, thus indicating that the flux was less than 1% of the copper flux. Use of the membranes was continued for 40 days. The copper flux for each membrane was measured periodically and plotted in FIG. 3b. For comparison, the copper flux for five Celgard 2400 membranes that contained LIX 54 but no gel of the present invention was studied under identical conditions, the results being shown in FIG. 3a. As is apparent, the copper flux for the gel membranes of the present invention was much more stable than that for the non-gel membranes. This difference in performance is believed to be caused in part by superior agent retention of the gel membrane of the present invention. This is supported by comparing the infrared (IR) spectra of fresh membranes with those of 40-day-old membranes with and without methacrylate gel. FIGS. 4a and 4b show the IR spectra of two Celgard 2400 membranes, one freshly loaded with LIX 54 (FIG. 4a) and one after 40 days of operation (FIG. 4b). (Celgard 2400 was used as the reference for these and all other spectra.) The six strong sharp bands between 1400 and 1600 cm$^{-1}$ can be attributed to the LIX 54-copper complex. The difference in the intensity of these bands for fresh and 40 day-old membranes indicates that nearly all of the LIX 54 had been lost from the non-gel membranes over the 40 days of operation. By contrast, the IR spectra for a fresh and a 40-day-old gel membrane of the present invention, shown in FIGS. 5a and 5b, respectively, indicate that although the spectral bands of the 40-day-old membrane are not as sharp as those of the fresh membrane, they are nearly so. Thus, most of the agent was retained by the gel membrane over 40 continuous days of operation and was not lost to the ammoniacal solution.

EXAMPLE 12

Figure 6:
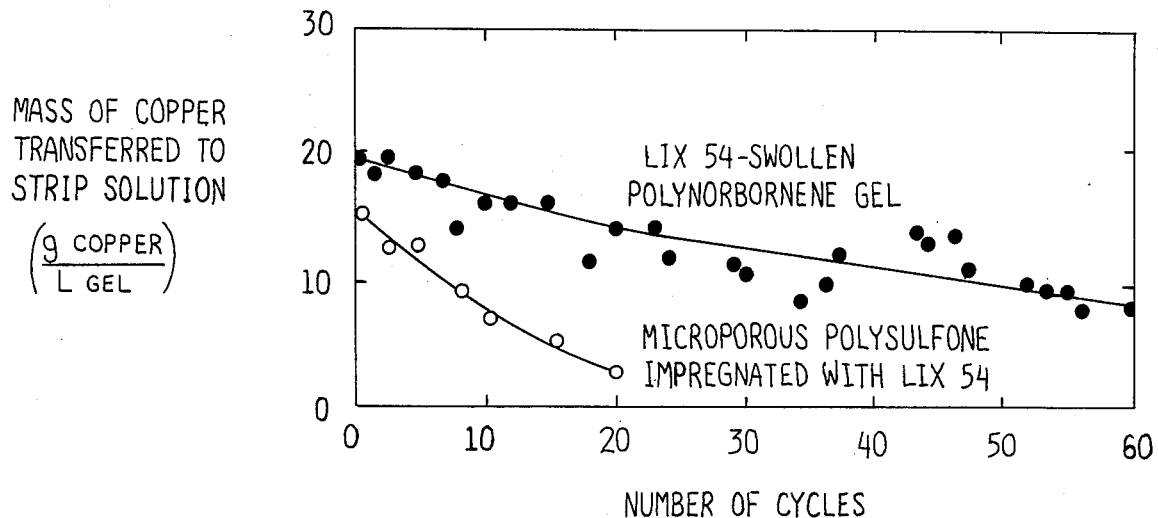
FIG. 6 is a graph comparing the ion-exchange ability over time of a gel of the present invention with a non-gel.

The LIX 54-swollen polynorborene gel of Example 8 was tested in the following manner. Approximately 1 g of the small gel pieces was cycled between 100 ml of commercial ammoniacal etchant solution that initially contained 160-g/L copper for 16 hours and 100 ml of product solution composed of 100-g/L $H_2SO_4$ for 8 hours. Thus each cycle lasted 24 hours. The gels were rinsed with water between each transfer from etchant to product solution and from product solution to etchant. The mass of copper transferred from the etchant solution to the product solution for each cycle is shown in FIG. 6. Also shown in FIG. 6 is the mass of copper transferred to the product solution by microporous polysulfone beads that contain LIX 54 but no gel. As is apparent from FIG. 6, the gel of the present invention not only transfers more copper per unit volume than the non-gel, but the rate of transfer is also more constant and lasts considerably longer. Again attesting to the far superior agent retention of the gels of the present invention, no organic ion-exchange agent could be detected in the ammoniacal etchant solution during the entire experiment. By way of contrast, when microporous media impregnated with LIX 54 is used, agent is clearly visible as a thin film on the surface of the etchant.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A copper ion-exchange gel comprising a hydrophobic nonporous polymer plasticized and swollen with a monomeric organic liquid copper ion-exchange agent selected from one or more of 1-n-octyl-phenyl-p-1,3-butanedione and alkyl-, aryl-, and halogen-substituted amides, beta-diketones, hydroxyoximes, sulfonamido oximes, hydroxyquniolines, sulfonamido quinolines, macrocyclic ethers, and macrocyclic amines, said agent being present in an amount sufficient to plasticize and swell said polymer and to extract copper metal ions.

2. The gel of claim 1 wherein said polymer is selected from one or more of alkyl-, aryl-, halogen- and amino-substituted polyethylenes, polypropylenes, polyacrylics, polyacrylates, polyurethanes, polyamides, polyetherimides, polyvinylbutyrals, polyacrylonitriles, polynorborenes, polyvinyl acetates, ethylene-vinylacetate copolymers, ethylene-propylene rubbers, styrene butadiene rubbers, and silicone rubbers.

3. A copper ion-exchange gel comprising silicone rubber plasticized and swollen with the agent 1-n-octyl-phenyl-p-1,3-butanedione, said agent being present in an amount sufficient to plasticize and swell said silicone rubber and to extract copper metal ions.

4. A copper ion-exchange gel comprising a polymer selected from polymethacrylate, polynorborene, polyurethane, silicone rubbers, and ethylene-vinylacetate copolymers, said polymer being plasticized and swollen with an agent comprising a beta-diketone, said agent being present in an amount sufficient to plasticize and swell said polymer and to extract copper metal ions.

5. The gel of claim 4 wherein the beta-diketone is a mixture of the ortho-, meta-, and paraforms of 1-hexyl-phenyl-1,3-butanedione and phenyl bis-[1,3-butanedione] in a hydrocarbon diluent.

6. The gel of claim 1 wherein said polymer has been polymerized in the presence of said agent.

7. The gel of claim 1 wherein said polymer is plasticized and swollen in the presence of an organic solvent.

8. The gel of claim 1 within the pores of or coated onto solid microporous support media.

9. The gel of claim 1 within the pores of or coated onto solid microporous support media selected from beads, fibers or sheets.

10. The gel of claim 1 coated onto a solid microporous support, said support itself containing said monomeric organic liquid copper ion-exchange agent.

* * * * *

UNITED STATES PATENT AND TRADEMARK OFFICE
CERTIFICATE OF CORRECTION

PATENT NO. : 4,622,344

DATED : November 11, 1986

INVENTOR(S) : Walter C. Babcock et al

It is certified that error appears in the above-identified patent and that said Letters Patent is hereby corrected as shown below:

Cover page, Col. 1, [75] Inventors: Insert after "Bend, Oreg." --Richard W. Baker, of Menlo Park, Cal.--

Col. 5, line 33, after "compatibility," delete --and--

Signed and Sealed this

Sixth Day of March, 1990

*Attest:*

JEFFREY M. SAMUELS

*Attesting Officer*  Acting Commissioner of Patents and Trademarks